United States Patent
Lee et al.

(10) Patent No.: US 9,407,149 B2
(45) Date of Patent: Aug. 2, 2016

(54) BUCK CONVERTING CONTROLLER FOR REDUCTION OF OUTPUT VOLTAGE OVERSHOOT

(71) Applicant: GREEN SOLUTION TECHNOLOGY CO., LTD., New Taipei (TW)

(72) Inventors: Li-Min Lee, New Taipei (TW); Chao Shao, Wuxi (CN); Zhong-Wei Liu, Wuxi (TW)

(73) Assignee: GREEN SOLUTION TECHNOLOGY CO., LTD., New Taipei (TW)

( * ) Notice: Subject to any disclaimer, the term of this patent is extended or adjusted under 35 U.S.C. 154(b) by 244 days.

(21) Appl. No.: 14/266,038

(22) Filed: Apr. 30, 2014

(65) Prior Publication Data

US 2015/0263619 A1    Sep. 17, 2015

(30) Foreign Application Priority Data

Mar. 11, 2014 (CN) .......................... 2014 1 0088115

(51) Int. Cl.
H02M 1/088 (2006.01)
H02M 3/158 (2006.01)
H02M 1/00 (2006.01)

(52) U.S. Cl.
CPC .... H02M 3/1588 (2013.01); *H02M 2001/0022* (2013.01); *Y02B 70/1466* (2013.01)

(58) Field of Classification Search
CPC ..... H02M 1/088; H02M 3/156; H02M 3/157; H02M 3/158; H02M 3/1588
USPC .......................... 323/271, 282, 283, 284, 285
See application file for complete search history.

(56) References Cited

U.S. PATENT DOCUMENTS

| | | | |
|---|---|---|---|
| 7,482,791 B2* | 1/2009 | Stoichita | H02M 3/156 323/271 |
| 7,764,054 B1* | 7/2010 | Guo | H02M 3/156 323/224 |
| 2008/0088284 A1* | 4/2008 | Weng | H02M 3/1563 323/271 |
| 2014/0062434 A1* | 3/2014 | Ouyang | H02M 3/156 323/271 |
| 2014/0197812 A1* | 7/2014 | Lee | H02M 1/143 323/282 |
| 2014/0327423 A1* | 11/2014 | Lee | H02M 3/156 323/288 |
| 2015/0214839 A1* | 7/2015 | Shiu | H02M 3/156 323/271 |
| 2015/0263619 A1* | 9/2015 | Lee | H02M 3/1588 323/271 |
| 2015/0326123 A1* | 11/2015 | Fukushima | H02M 3/158 323/271 |
| 2016/0028311 A1* | 1/2016 | Murakami | H02M 3/158 323/271 |

* cited by examiner

*Primary Examiner* — Jeffrey Sterrett
(74) *Attorney, Agent, or Firm* — Muncy, Geissler, Olds & Lowe, P.C.

(57) ABSTRACT

A buck converting controller, adapted to control a DC-DC buck converting circuit to convert an input voltage into an output voltage, is disclosed. The buck converting controller comprises a feedback control circuit, an off-time determination circuit and a load control circuit. The feedback control circuit turns on and off a high-side transistor and a low-side transistor of the DC-DC buck converting circuit in response to a feedback signal indicative of the output voltage. The off-time determination circuit determines a preset off-time period according to the input voltage and the output voltage and generates an off notice signal according to the preset off-time period. The load control circuit is coupled to the DC-DC buck converting circuit and determines whether to release an electronic energy stored in the DC-DC buck converting circuit according to the off notice signal.

16 Claims, 5 Drawing Sheets

BUCK CONVERTING CONTROLLER FOR REDUCTION OF OUTPUT VOLTAGE OVERSHOOT

BACKGROUND OF THE INVENTION (1) Field of the Invention

The invention relates to a buck converting controller, and more particularly relates to a buck converting controller with preventing the overshoot.

(2) Description of the Prior Art

Relative to a fixed-frequency control structure, a constant on-time control structure applied to a DC-DC buck converting circuit greatly improves an undershoot of an output voltage. However, an overshoot of the output voltage does not be obviously improved.

FIG. 1 is a schematic diagram of a DC-DC buck converting circuit with inhibiting the overshoot disclosed in U.S. Pat. No. 7,274,177. Driving circuits 208 and 210 of a buck pulse width modulation stage respectively output a high-side control signal UG and a low-side control signal LG for respectively controlling a pair of power switches SW1 and SW2. The power switches SW1 and SW2 are, connected in series, between an input voltage Vin and a grounding for generating an inductance current IL by through an inductance L. A capacitance Co is charged through the inductance current IL to generate an output voltage Vout for a load 212. An overshoot inhibiting circuit 400 is coupled to the output voltage Vout and the grounding and comprises an inductance 412 and a transistor 414. An operation amplifier 416 serves as a voltage detector to detect the output voltage Vout and compares the output voltage Vout with a reference voltage Vref to generate a signal P1 for switching the transistor 414. The transistor 414 is cut off in normal state. When the output voltage Vout is higher than the reference voltage Vref, the signal P1 turns on the transistor 414. A diode D is coupled between the inductance 412 and a battery 418. If the capacitance Co is not enough to absorb the energy released by the inductance L, the output voltage Vout will exceed the reference voltage Vref when the load 212 changes from a heavy load to a light load. This causes the operation amplifier 416 to output the signal P1 to turn on the transistor 414. After the transistor 414 is turned on, the inductance 412 absorbs the energy released from the inductance L, and so pulls the output voltage Vout lower. Until the output voltage Vout is reduced to be lower than the reference voltage Vref, the operation amplifier 416 cuts off the transistor 414. Most of the released energy due to the changing of the load 212 is transmitted through the inductance 412 and the diode D into the battery 418 for storing. The battery 418 can supply power to other elements, and this system has almost no extra energy consumption.

FIG. 2 is a schematic diagram of a voltage-mode DC-DC buck converting circuit disclosed in U.S. Pat. No. 8,330,442. The voltage-mode DC-DC buck converting circuit comprises a control circuit 610, a gate driver circuit 620 and a power stage circuit 630. The control circuit 610 comprises an error amplifier 612, a modulator 614, a signal generator 616 and a comparator 618. The error amplifier 612 compares an output voltage Vout with a reference voltage Vref to generate a compensation signal Sc to the modulator 614. Besides, the signal generator 616 can output a ramp signal Sr with one of a first frequency F1 or a second frequency F2 to the modulator 614. The modulator 614 generates a PWM signal Sp according to the compensation signal Sc and the ramp signal Sr. The gate driver circuit 620 receives the PWM signal Sp and accordingly generates a first driving signal S1d and a second driving signal S2d to the power stage circuit 630. So, the power stage circuit 630 provides an output current Iout and the output voltage Vout.

The signal generator 616 can output the ramp signal Sr with the first frequency F1 or the second frequency F2, or other waveform signal with the first frequency F1 or the second frequency F2, such as: triangle wave signal. Wherein, the first frequency F1 is lower than the second frequency F2. Besides, the comparator 618 receives a threshold voltage Vth and the output voltage Vout. When the output voltage Vout is lower than the threshold voltage Vth, the comparator 618 outputs a first level signal to the signal generator 616. At this moment, the signal generator 616 outputs the ramp signal Sr with the first frequency F1 to the modulator 614. On the other hand, when the output voltage Vout is higher than the threshold voltage Vth, the comparator 618 outputs a second level signal to the signal generator 616. At this moment, the signal generator 616 outputs the ramp signal Sr with the second frequency F2 to the modulator 614.

When the compensation signal Sc is higher than the ramp signal Sr, the PWM signal Sp is at a high level. When the compensation signal Sc is lower than the ramp signal Sr, the PWM signal Sp is at a low level. Obviously, when the ramp signal Sr changes, the PWM signal Sp changes. Besides, when the ramp signal Sr is at the first frequency F1, the PWM signal Sp operates at the first frequency F1; when the ramp signal Sr is at the second frequency F2, the PWM signal Sp operates at the second frequency F2. Thereby, when the output voltage Vout is higher than the threshold voltage Vth, that is, when the overshoot occurring, the operating frequency is increased to increase the switching speed of the power stage circuit 630 and then inhibits the overshoot.

The aforementioned technology of inhibiting the overshoot is to compare the output voltage with the reference voltage, and executes the inhibiting overshoot when the overshoot occurring. FIG. 3 is a waveform diagram of a conventional overshoot inhibiting technology by comparing an output voltage with a reference voltage. At a time point t0, the output voltage Vout is higher than the threshold voltage Vth. However, since the circuit has time delays, the overshoot inhibiting postpones to execute at the time point t1. Therefore, the time delays in circuit are unfavorable to inhibit the overshoot. Furthermore, if the reference voltage is set too close to the expected output voltage, it affects the feedback control to make the feedback control be unsteady, but if the reference voltage is set farther, the effect of the overshoot inhibiting is very poor.

SUMMARY OF THE INVENTION

In view of the defects of the conventional overshoot inhibiting technology, the present invention can predict a timing of overshoot occurring by detecting a conduction time period of the low-side transistor, and accordingly executes the overshoot inhibiting the overshoot to achieve the better effects of inhibiting the overshoot, and also avoids the setting problems of the reference voltage.

To accomplish the aforementioned and other objects, the present invention provides a buck converting controller, adapted to control a DC-DC buck converting circuit to convert an input voltage into an output voltage. The buck converting controller comprises a feedback control circuit, an off-time determination circuit and a load control circuit. The feedback control circuit controls a high-side transistor and a low-side transistor of the DC-DC buck converting circuit to be turned on and off according to a feedback signal indicative of the output voltage. The off-time determination circuit determines a preset off-time period according to the input voltage and the output voltage, and generates an off notice signal according to the preset off-time period. The load control circuit generates an overshoot preventing signal according to the off notice signal. Wherein, the feedback control circuit controls the low-side transistor to be cut off when receiving the overshoot preventing signal.

The present invention also provides a buck converting controller, adapted to control a DC-DC buck converting circuit to convert an input voltage into an output voltage. The buck converting controller comprises a feedback control circuit, an off-time determination circuit and a load control circuit. The feedback control circuit controls a high-side transistor and a low-side transistor of the DC-DC buck converting circuit to be turned on and off according to a feedback signal indicative of the output voltage. The off-time determination circuit determines a preset off-time period according to the input voltage and the output voltage, and generates an off notice signal according to the preset off-time period. The load control circuit is coupled to the DC-DC buck converting circuit, and determines whether releasing a stored energy of the DC-DC buck converting circuit according to the off notice signal.

The present invention still provides a buck converting controller, adapted to control a DC-DC buck converting circuit to convert an input voltage into an output voltage, comprising a feedback control circuit, an off-time determination circuit and a load control circuit. The feedback control circuit controls a high-side transistor and a low-side transistor of the DC-DC buck converting circuit to be turned on and off according to a feedback signal indicative of the output voltage, wherein, the high-side transistor is turned on with a fixed time period each cycle. The off-time determination circuit determines a preset off-time period according to the input voltage and the output voltage, and generates an off notice signal according to the preset off-time period. The load control circuit generates an overshoot preventing signal according to the off notice signal. Wherein, the feedback control circuit shortens the fixed time period or stops the high-side transistor to be turned on within a preset number of cycles after receiving the overshoot preventing signal.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
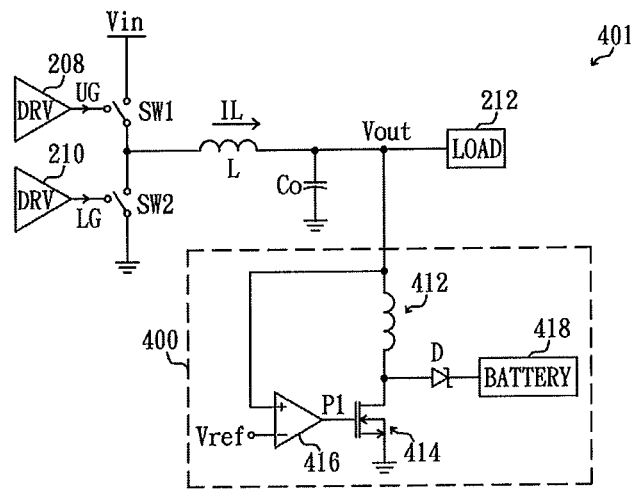
FIG. 1 is a schematic diagram of a DC-DC buck converting circuit with inhibiting the overshoot disclosed in U.S. Pat. No. 7,274,177.
Figure 2:
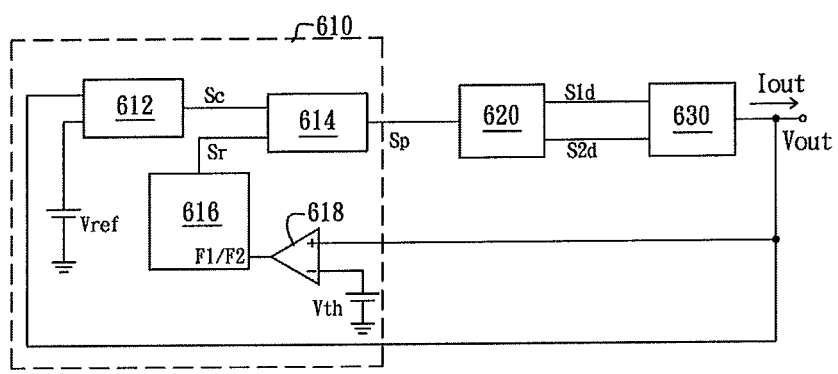
FIG. 2 is a schematic diagram of a DC-DC buck converting circuit in voltage mode disclosed in U.S. Pat. No. 8,330,442.
Figure 3:
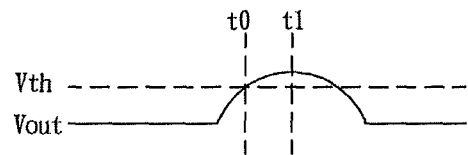
FIG. 3 is a waveform diagram of a conventional technology compared an output voltage with a reference voltage for executing inhibiting the overshoot.
Figure 4:
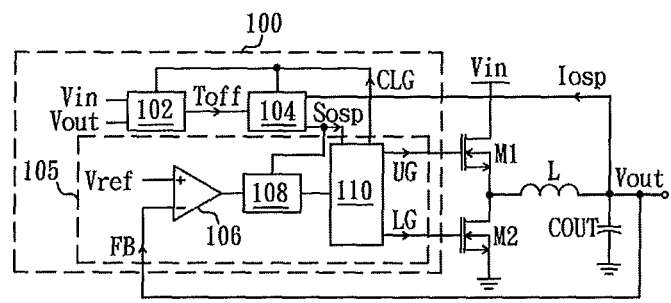
FIG. 4 is a schematic diagram of a buck converting controller according to a first preferred embodiment of the present invention.

FIG. 4 is a schematic diagram of a buck converting controller according to a first preferred embodiment of the present invention, configured to control a DC-DC buck converting circuit to convert an input voltage Vin into an output voltage Vout. The DC-DC buck converting circuit comprises a high-side transistor M1, a low-side transistor M2, an inductance L and an output capacitance COUT. One terminal of the high-side transistor M1 and one terminal of the low-side transistor M2 are connected in series via a connected node, another terminal of the high-side transistor M1 is coupled to the input voltage Vin, and another terminal of the low-side transistor M2 is coupled to the ground. One terminal of the inductance L is coupled to the connected node of the high-side transistor M1 and the low-side transistor M2, and the other terminal thereof is coupled to the output capacitance COUT for providing the output voltage Vout.

The buck converting controller 100 comprises a feedback control circuit 105, an off-time determination circuit 102 and a load control circuit 104. The feedback control circuit 105 generates a high-side control signal UG and a low-side control signal LG according to a feedback signal FB indicative of the output voltage Vout to respectively control the high-side transistor M1 and the low-side transistor M2 of the DC-DC buck converting circuit to be turned on and off. The feedback control circuit 105 comprises a comparator 106, an on-time determination circuit 108 and a logic control circuit 110. A non-inverting terminal of the comparator 106 receives a reference voltage Vref, and an inverting terminal thereof receives the feedback signal FB. When the feedback signal FB is lower than the reference voltage Vref, a high level signal is generated at an output end of the comparator 106. The on-time determination circuit 108 is coupled to the comparator 106, and generates a pulse signal with a fixed pulse width when receiving the high level signal outputted by the comparator 106. The logic control circuit 110 generates the high-side control signal UG and the low-side control signal LG according to the pulse signal generated by the on-time determination circuit 108. The pulse width of the pulse signal generated by the on-time determination circuit 108 determines the pulse width of the high-side control signal UG, i.e., the conduction time of the high-side transistor M1. To avoid the reverse current occurring, the logic control circuit 110 can further judge whether the reverse current occurring according to a current of the inductance L, and cuts off the low-side transistor M2 in advance for avoiding the reverse current occurring. The off-time determination circuit 102 counts for a preset off-time period according to the input voltage Vin and the output voltage Vout. In a steady state, a ratio of an ON period On and an OFF period Off of each cycles is On:Off=Vout:(Vin−Vout). In addition, the preset cut-off time period counted by the off-time determination circuit 102 according to the input voltage Vin and the output voltage Vout is the time period of the OFF period Off in the steady state. The logic control circuit 110 generates an off period signal CLG, indicative of the cut-off period, to the off-time determination circuit 102. The off-time determination circuit 102 starts counting when receiving the off period signal CLG and simultaneously generates an off notice signal Toff. After the preset off-time period passed, the off-time determination circuit 102 stops generating the off notice signal Toff. The load control circuit 104 is coupled to the off-time determination circuit 102 and generates an overshoot preventing signal Sosp according to the off notice signal Toff. The feedback control circuit 105 is coupled to the load control circuit 104, and controls the low-side transistor M2 to cut off when receiving the overshoot preventing signal Sosp.

Besides, the on-time determination circuit 108 shortens pulse widths of the pulse signals within a preset number of cycles after receiving the overshoot preventing signal Sosp, such as: the first one or two cycles after receiving the overshoot preventing signal Sosp. In general, the on-time determination circuit 108 may determine the pulse width of the pulse signal by comparing a conduction reference voltage and a voltage across a conduction capacitor charged by a charging current. If so, it can be by reducing the conduction reference voltage of the on-time determination circuit 108 or raising the charging current to achieve the effect of shortening the pulse width of the pulse signal. Or it also can stop the pulse signal to be generated within a preset number of cycles after receiving the overshoot preventing signal Sosp. Thus, the present invention may shorten the conduction time of the high-side transistor or stop the high-side transistor to be turned on within the preset number of the cycles. At that time, the buck converting circuit delivers less energy to the output capacitance COUT to achieve the better effect of inhibiting the overshoot.

Of course, the methods of inhibiting overshoot of the present embodiment can be used single or jointly in response to actual applications.

Figure 5:
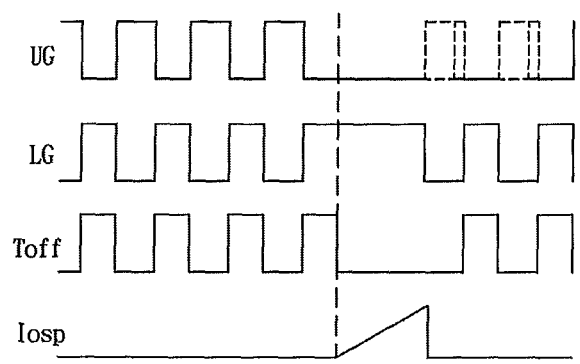
FIG. 5 shows signal waveforms when the buck converting controller and the conventional buck converting controller shown in FIG. 4 occur the overshoot.

FIG. 5 shows signal waveforms when the buck converting controller and the conventional buck converting controller shown in FIG. 4 occur the overshoot. Before dashed lines in FIG. 5, the system operates in a steady state, the low-side control signal LG is synchronous with the off notice signal Toff. When the actual time period of the cut-off period exceeds the preset cut-off period, it represents the load is reducing to cause the cut-off period of the present cycle getting longer. The low-side control signal LG of the conventional buck converting controller is still at the high level to extend the on-time of the low-side transistor M2. In contrast, the off-time determination circuit 102 of the present invention stops generating the off notice signal Toff when the preset off-time period passed. At this moment, the low-side transistor M2 is cut off and so the current of the inductance L flows through a body diode of the low-side transistor M2 instead of the conducted low-side transistor M2. Therefore, the power consumption is increased due to the large voltage drop of the body diode to inhibit the overshoot. Besides, the load control circuit 104 of the present invention can further be coupled to the DC-DC buck converting circuit, such as: the output terminal, the connected node of the high-side transistor and the low-side transistor, etc., for according to the off notice signal Toff releasing energy stored in energy-storage elements, e.g.: the inductance L and the output capacitance COUT of the DC-DC buck converting circuit. Thereby, the present invention can achieve the function of inhibiting the overshoot rapidly. As the embodiment shown in FIG. 4, the load control circuit 104 is coupled to the output voltage Vout and executes a current sinking from the output voltage Vout to generate a loading current Iosp after a falling edge of the off notice signal Toff until next cycle. Furthermore, within the first preset number of the cycles, the high-side control signal UG also can shorten the pulse width or be stopped as shown by the dashed lines in FIG. 5.

The two methods of inhibiting the overshoot in the aforementioned present invention can be used single or jointly in response to the actual application. The load control circuit 104 can take a constant time period or detect the output voltage Vout to determine when to stop the loading current Iosp.

Figure 6:
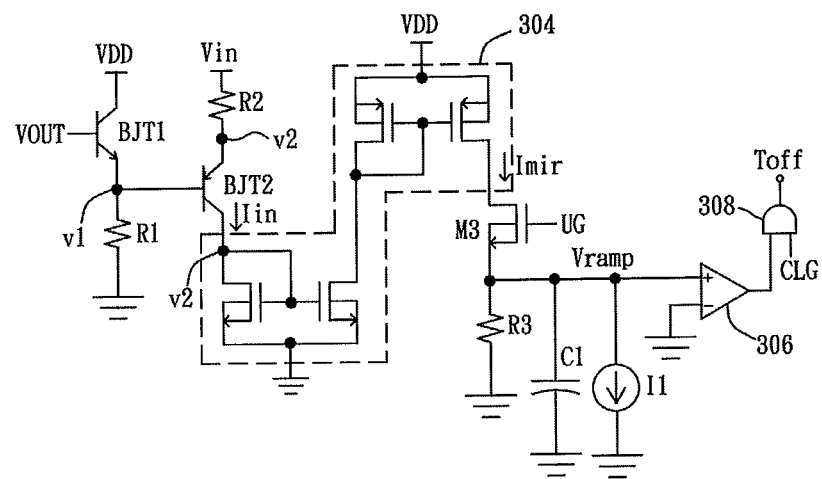
FIG. 6 is a schematic diagram of an off-time determination circuit according to a first preferred embodiment of the present invention.

FIG. 6 is a schematic diagram of an off-time determination circuit according to a first preferred embodiment of the present invention. A first bipolar junction transistor BJT1 has a first collector, a first base and a first emitter. The first collector is coupled to a driving voltage VDD, the first base is coupled to an output voltage Vout, and the first emitter is coupled to a ground potential via a first resistance R1. Thus, a potential v1 of a connected node of the first resistance R1 and the emitter of the first bipolar junction transistor BJT1 is (Vout−Vbe1). Wherein, Vbe1 is a forward bias voltage of the first bipolar junction transistor BJT1. A second bipolar junction transistor BJT2 has a second collector, a second base and a second emitter. The second emitter is coupled to an input voltage Vin via a second resistance R2, and the second base is coupled to the connected node of the first emitter of the first bipolar junction transistor BJT1 and the first resistance R1. A potential v2 of a connected node of the second emitter of the second bipolar junction transistor BJT2 and the second resistance R2 is (v1+Vbe2=Vout−Vbe1+Vbe2). If Vbe1=Vbe2, v2=Vout. Wherein, Vbe2 is a forward bias voltage of the second bipolar junction transistor BJT2. Thus, a current Iin outputted by the collector of the second bipolar junction transistor BJT2 is almost equal to the current flowing through the second resistance R2, which is (Vin−Vout)/R2. That is, the current Iin is proportional to a voltage of subtracting the output voltage Vout from the input voltage Vin.

A current mirror circuit 304 mirrors the current Iin outputted by the second collector of the second bipolar junction transistor BJT2 to provide to a mirror current Imir flowing through a transistor M3. Also, the mirror current Imir is proportional to the voltage of subtracting the output voltage Vout from the input voltage Vin. The transistor M3 is controlled by a high-side control signal UG. The transistor M3 is turned on when the high-side control signal UG is at a high level, i.e, the ON period. A third resistance R3 and a capacitance C1 are connected in parallel. In the ON period, the mirror current Imir charges the capacitance C1 until that a ramp voltage Vramp of the capacitance C1 reaches a voltage R3*Imir. A discharge current source I1 is coupled to the capacitance C1 simultaneously, for discharging the capacitance C1. Due to the mirror current Imir is far greater than the current of the discharge current source I1, and so an affection of the discharge current source I1 to the ramp voltage Vramp can be omitted in the ON period. Because the mirror current Imir is proportional to the voltage of subtracting the output voltage Vout from the input voltage Vin, a variation range of the voltage of the capacitance C1 (i.e., the voltage amplitude) is also proportional to the voltage of subtracting the output voltage Vout from the input voltage Vin. When the ON period is ended, the transistor M3 is cut off and then the discharge current source I1 starts discharging the capacitance C1 to drop the ramp voltage Vramp. A preset off time Toff_c of the ramp voltage Vramp dropped to be zero can be expressed as Toff_c=(R3*Imir)/I1=(R3*K*Iin)/I1=R3*K*(Vin−Vout)/(R2*I1), wherein, K is a constant.

Thus, when I1=(R3*K*Vout)/(R2*Ton), Toff_c=Ton*(Vin−Vout)/Vout. Wherein, Ton is a time period of the ON period On; that is, the conduction time period of the transistor M1 when the converting circuit operates in a steady state.

A non-inverting terminal of a comparator 306 receives the ramp voltage Vramp, an inverting terminal thereof is coupled to the ground (or a positive level slightly higher than the ground potential), and the output terminal thereof is connected to an AND gate 308. The AND gate 308 generates an off notice signal Toff according to an output signal of the comparator 306 and an off period signal CLG. When the off period signal CLG is at a high level and the ramp voltage Vramp is larger than zero, that is, a time period of the preset off time in the cut-off period, the AND gate 308 generates the off notice signal Toff.

Figure 7:
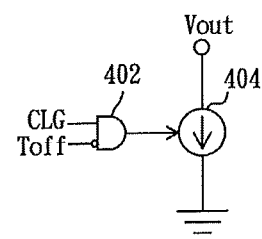
FIG. 7 is a schematic diagram of a load control circuit according a first preferred embodiment of the present invention.

FIG. 7 is a schematic diagram of a load control circuit according a first preferred embodiment of the present invention. The load control circuit is coupled to an output voltage Vout, comprising an AND gate 402 and a current source 404. The AND gate 402 receives a reversed off notice signal Toff and an off period signal CLG. Thus, when the system enters the cut-off period (the off period signal CLG is at a high level) for the preset off time, the off notice signal Toff is changed to be a low level and so the AND gate 402 outputs a high level signal to enable the current source 404. At this moment, the current source 404 starts to release the energy of the output voltage Vout and so a releasing current flows out from the output voltage Vout to pull the output voltage Vout with down. The current source 404 can be a fixed current source or a current source providing a current increasing with time. Therefore, the load control circuit starts to release the stored energy of the DC-DC buck converting circuit after a high-side transistor M1 has been cut-off for the preset off-time period. Referring to FIG. 4, when the feedback signal FB is lower than the reference voltage Vref, i.e., the output voltage Vout is back to a preset output voltage, next cycle starts. At this moment, the off period signal CLG is changed to be a low level, the AND gate 402 outputs a low level signal to make the current source 404 stop releasing the energy of the output voltage Vout more.

Of course, the load control circuit also can additionally add a comparator, configured to judge whether the output voltage Vout coming back to a stopping voltage, for stopping the current source 404 releasing energy of the output voltage Vout. Wherein, the stopping voltage is a little higher than the preset output voltage.

Figure 8:
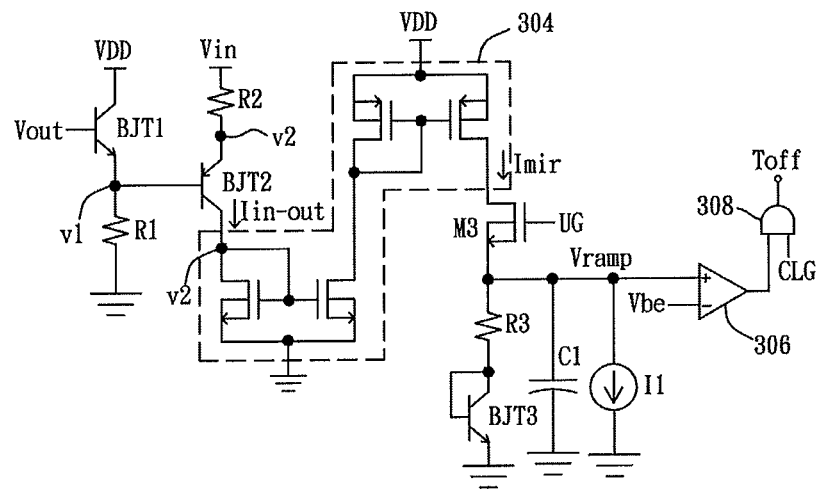
FIG. 8 is a schematic diagram of an off-time determination circuit according to a second preferred embodiment of the present invention.

FIG. 8 is a schematic diagram of an off-time determination circuit according to a second preferred embodiment of the present invention. Compared with the embodiment shown in FIG. 6, the off-time determination circuit shown in FIG. 8 adds a third bipolar junction transistor BJT3. The third bipolar junction transistor BJT3 and the third resistance R3 are connected in series, and then are connected to the capacitance C1 in parallel. A third base of the third bipolar junction transistor BJT3 is coupled to a third collector thereof. The non-inverting terminal of the comparator 306 receives the ramp voltage Vramp, the inverting terminal thereof is coupled to an off reference voltage Vbe, and the output terminal thereof is connected to the AND gate 308. In the ON period, the mirror current Imir charges the capacitance C1 until that a connected node potential of the third resistance R3 and the capacitance C1, i.e., the ramp voltage Vramp=R3*Imir+Vbe3. Wherein, Vbe3 is a forward bias voltage of the third bipolar junction transistor BJT3. In the present embodiment, the forward bias voltage Vbe3 is equal to the off reference voltage Vbe. When the ON period is ended, the transistor M3 is cut off and the discharge current source I1 discharges the capacitance C1 and the ramp voltage Vramp starts to be dropped. A preset off time Toff_c of the ramp voltage Vramp dropped to reach the off reference voltage Vbe can be expressed as Toff_c=(R3*Imir+Vbe3−Vbe)/I1=(R3*K*Iin-out)/I1=R3*K*(VIN−VOUT)/(R2*I1). Wherein, K is a constant.

Therefore, the preset off time Toff_c of the embodiment shown in FIG. 8 is the same as the embodiment shown in FIG. 6.

Figure 9:
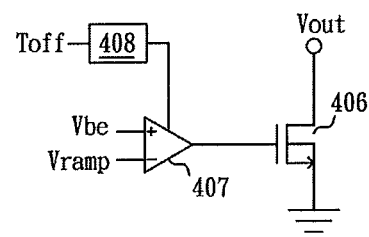
FIG. 9 is a schematic diagram of a load control circuit according to a second preferred embodiment of the present invention.

FIG. 9 is a schematic diagram of a load control circuit according to a second preferred embodiment of the present invention. It can be coordinated with the off-time determination circuit shown in FIG. 8 to execute the function of inhibiting the overshoot. The load control circuit comprises a transistor 406, an operation amplifier 407 and a timer 408. The timer 408 receives the off notice signal Toff and enables the operation amplifier 407 in a preset time after the falling edge of the off notice signal Toff. The operation amplifier 407 receives the off reference voltage Vbe and the ramp voltage Vramp, and amplifies a voltage difference of the off reference voltage Vbe and the ramp voltage Vramp to control an on-state resistance of the transistor 406. Referring to FIG. 8, if the converting circuit operates in a non-steady state, it causes that the preset off time is passed but the high-side control signal UG is still at the low level. At this moment, the discharge current source I1 is still discharging the capacitance C1 to make the ramp voltage Vramp be dropped until zero. The required time period of the ramp voltage Vramp dropped from the off reference voltage Vbe to zero is a preset extra time period. Thus, within the preset extra time period, while the ramp voltage Vramp is continuously dropped, an output voltage of the operation amplifier 407 continuously raises to increase the pull-down ability of the transistor 406, i.e., the ability of conducting an energy-releasing current from the output voltage Vout. After the preset extra time period passing, the pull-down ability of the transistor 406 do not change any more and so the energy-releasing current is kept at a fixed value for avoiding the output voltage Vout undershooting due to an over large energy-releasing current.

Figure 10:
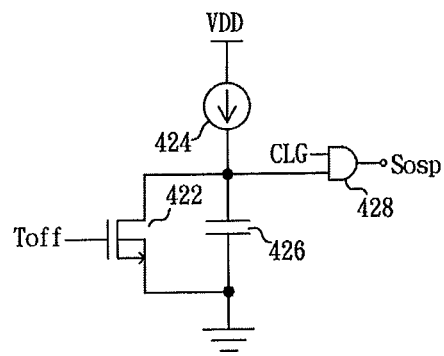
FIG. 10 is a schematic diagram of a load control circuit according to a third preferred embodiment.
Figure 11:
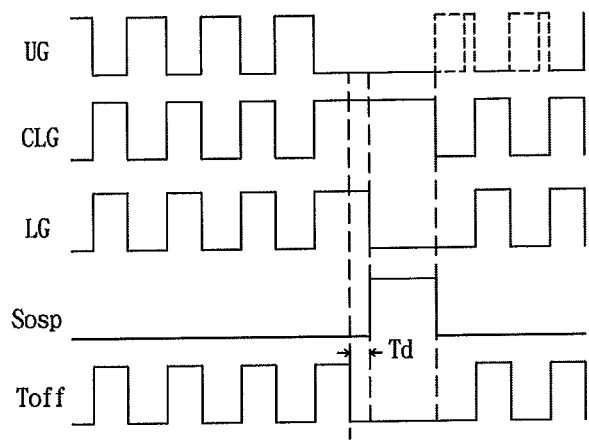
FIG. 11 shows signal waveforms of the load control circuit in FIG. 10.

FIG. 10 is a schematic diagram of a load control circuit according to a third preferred embodiment. The load control circuit generates the overshoot preventing signal Sosp when the off notice signal Toff continuously generates for a preset delay time, so as to avoid erroneous judgment. A transistor 422 receives the off notice signal Toff and is turned on when the off notice signal Toff is at the high level to reset a voltage of a capacitance 426 to be zero. When the off notice signal Toff is at the low level, the transistor 422 is cut off. A current source 424 and the capacitance 426 are connected in series. The current source 424 charges the capacitance 426 when the transistor 422 is cut off. Input terminals of an AND gate 428 are coupled to the capacitance 426 and the off period signal CLG, and the AND gate 428 outputs the overshoot preventing signal Sosp when the voltage of the capacitance 426 raises to a logic judging level and the off period signal CLG is also at the high level. FIG. 11 shows signal waveforms of the load control circuit in FIG. 10. When the off notice signal Toff is changed to be at the low level for a preset delay time Td and the off period signal CLG is still at the high level, the load control circuit generates the overshoot preventing signal Sosp until the off period signal CLG is changed to be at the low level. Referring to FIG. 4, when the logic control circuit 110 receives the overshoot preventing signal Sosp, the low-side control signal LG is immediately changed to be at the low level to cut off the low-side transistor M2. Thus, the body diode of the low-side transistor M2 consumes more energy for inhibiting the overshoot, and furthermore the elements of the system can be protected from being damaged due to a reverse current when the low-side transistor M2 is continuously turned, such as: the high-side transistor M1.

Furthermore, the load control circuits shown in FIG. 7 and FIG. 9 determine whether inhibiting the overshoot according to the off notice signal Toff. Of course, they also can be modified to determine whether inhibiting the overshoot according to the overshoot preventing signal Sosp, as the embodiment shown in FIG. 10, for avoiding starting inhibiting the overshoot erroneously.

As the aforementioned, the load control circuit can inhibit the overshoot by means of cutting off the low-side transistor M2 or/and releasing the energy stored in the DC-DC buck converting circuit. Thus, the load control circuit of the preset invention can have a better ability of inhibiting the overshoot by simultaneously using the two means' than that of the circuits of the aforementioned embodiments.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A buck converting controller, adapted to control a DC-DC buck converting circuit to convert an input voltage into an output voltage, comprising:
   a feedback control circuit, controlling a high-side transistor and a low-side transistor of the DC-DC buck converting circuit to be turned on and off according to a feedback signal indicative of the output voltage;
   an off-time determination circuit, determining a preset off-time period according to the input voltage and the output voltage, and generating an off notice signal according to the preset off-time period; and
   a load control circuit, generating an overshoot preventing signal according to the off notice signal;
   wherein, the feedback control circuit controls the low-side transistor to be cut off when receiving the overshoot preventing signal.

2. The buck converting controller according to claim 1, wherein the off-time determination circuit comprises:
   a first bipolar junction transistor, having a first collector, a first base and a first emitter, and the first collector coupled to a driving voltage, the first base coupled to the output voltage, and the first emitter coupled to a common potential via a first resistance; and
   a second bipolar junction transistor, having a second collector, a second base and a second emitter, and the second emitter coupled to the input voltage via a second resistance, and the second base coupled to a connected node of the first emitter and the first resistance, and a current outputted by the second collector proportional to a voltage of subtracting the output voltage from the input voltage.

3. The buck converting controller according to claim 1, wherein the load control circuit comprises an energy-releasing circuit coupled to the DC-DC buck converting circuit, and the energy-releasing circuit releases a stored energy of the DC-DC buck converting circuit when receiving the off notice signal.

4. The buck converting controller according to claim 3, wherein the energy-releasing circuit comprises a transistor coupled to the output voltage, and when the energy-releasing circuit receives the off notice signal, the transistor conducts an energy-releasing current, increased with time, from the output voltage.

5. The buck converting controller according to claim 4, wherein the energy-releasing current is maintained at a fixed value after conducted for a preset time.

6. The buck converting controller according to claim 1, wherein the load control circuit comprises a delay circuit, and generates the overshoot preventing signal according to the off notice signal and a preset delay time.

7. A buck converting controller, adapted to control a DC-DC buck converting circuit to convert an input voltage into an output voltage, comprising:
   a feedback control circuit, controlling a high-side transistor and a low-side transistor of the DC-DC buck converting circuit to be turned on and off according to a feedback signal indicative of the output voltage;
   an off-time determination circuit, determining a preset off-time period according to the input voltage and the output voltage, and generating an off notice signal according to the preset off-time; and
   a load control circuit, coupled to the DC-DC buck converting circuit, and determining whether releasing a stored energy of the DC-DC buck converting circuit according to the off notice signal.

8. The buck converting controller according to claim 7, wherein the load control circuit releases the stored energy of the DC-DC buck converting circuit when the high-side transistor is cut off for the preset off-time period.

9. The buck converting controller according to claim 8, wherein the load control circuit comprises a delay circuit and generates a overshoot preventing signal according to the off notice signal and a preset delay time.

10. The buck converting controller according to claim 7, wherein the load control circuit comprises a transistor coupled to the output voltage and determining whether conducting an energy-releasing current from the output voltage according to the off notice signal, wherein the energy-releasing current is increased with time.

11. The buck converting controller according to claim 10, wherein the energy-releasing current is maintained at a fixed value after conducted for a preset time.

12. A buck converting controller, adapted to control a DC-DC buck converting circuit to convert an input voltage into an output voltage, comprising:
   a feedback control circuit, controlling a high-side transistor and a low-side transistor of the DC-DC buck converting circuit to be turned on and off according to a feedback signal indicative of the output voltage, wherein the high-side transistor is turned on with a fixed time period each cycle;
   an off-time determination circuit, determining a preset off-time period according to the input voltage and the output voltage, and generating an off notice signal according to the preset off-time period; and a load control circuit, generating an overshoot preventing signal according to the off notice signal;

wherein, the feedback control circuit shortens the fixed time period of the high-side transistor or stops the high-side transistor to be turned on within a preset number of cycles after receiving the overshoot preventing signal.

13. The buck converting controller according to claim 12, wherein the off-time determination circuit comprises:

a first bipolar junction transistor, having a first collector, a first base and a first emitter, and the first collector coupled to a driving voltage, the first base coupled to the output voltage, and the first emitter coupled to a common potential via a first resistance; and a second bipolar junction transistor, having a second collector, a second base and a second emitter, the second emitter coupled to the input voltage via a second resistance, the second base coupled to a connected node of the first emitter and the first resistance, and a current outputted by the second collector proportional to a voltage of subtracting the output voltage from the input voltage.

14. The buck converting controller according to claim 12, wherein the load control circuit comprises a delay circuit, and generates the overshoot preventing signal according to the off notice signal and a preset delay time.

15. The buck converting controller according to claim 12, wherein the feedback control circuit controls the low-side transistor to be cut off when receiving the overshoot preventing signal.

16. The buck converting controller according to claim 12, wherein the load control circuit is coupled to the DC-DC buck converting circuit, and determines whether releasing a stored energy of the DC-DC buck converting circuit according to the off notice signal.

* * * * *